United States Patent [19]

Murdoch et al.

[11] Patent Number: 4,623,028
[45] Date of Patent: Nov. 18, 1986

[54] SEAL ASSEMBLY FOR DRILL BITS

[75] Inventors: Henry W. Murdoch, Humble; Percy W. Schumacher, Houston, both of Tex.

[73] Assignee: Reed Tool Company, Houston, Tex.

[21] Appl. No.: 776,452

[22] Filed: Sep. 16, 1985

[51] Int. Cl.[4] ............................................. E21B 10/22
[52] U.S. Cl. ..................................... 175/371; 277/92; 384/94
[58] Field of Search .................. 175/227, 371, 372; 277/92, 95; 384/94, 152, 489

[56] References Cited

U.S. PATENT DOCUMENTS

| | | | |
|---|---|---|---|
| 3,397,928 | 8/1968 | Galle | 277/81 |
| 3,467,448 | 9/1969 | Galle | 308/8.2 |
| 3,656,764 | 4/1972 | Robinson | 175/371 |
| 3,944,306 | 3/1976 | Neilson | 308/187.1 |
| 4,176,848 | 12/1979 | Lafuze | 175/371 |
| 4,306,727 | 12/1981 | Deane et al. | 175/371 |
| 4,344,629 | 8/1982 | Oelke | 277/1 |
| 4,394,020 | 7/1983 | Oelke | 277/1 |
| 4,466,621 | 8/1984 | Garner et al. | 277/92 |
| 4,466,622 | 8/1984 | Deane et al. | 175/371 |
| 4,516,641 | 5/1985 | Burr | 277/92 |

FOREIGN PATENT DOCUMENTS 2743825  4/1979  Fed. Rep. of Germany ...... 175/372

Primary Examiner—Stephen J. Novosad
Assistant Examiner—Terry Lee Melius

[57] ABSTRACT

A seal assembly (34) for a roller cutter drill bit (10). Seal assembly (34) has an elastomeric resilient O-ring 44 adjacent one sealing surface and a dynamic elastomeric O-ring (46) adjacent another sealing surface. A rigid carrier (52) is mounted between the O-rings (44, 46) which are unsecured to their associated sealing surfaces. A key (54) on carrier (52) limits rotation of the carrier (52) and static O-ring (46) relative to the associated sealing surface (38).

13 Claims, 7 Drawing Figures

SEAL ASSEMBLY FOR DRILL BITS

BACKGROUND OF THE INVENTION

This invention relates to a seal assembly for a roller cutter drill bit and more particularly to a seal assembly positioned between opposed sealing surfaces on a journal of the bit body and a rotary cutter mounted on the journal for rotation.

A roller cutter drill bit includes a roller cutter mounted for rotation on a bearing journal of the drill bit body, and bearing means mounting the roller cutter on the bearing journal. A lubrication system is provided to supply lubricant to the bearing means, and sealing means are normally mounted between the roller cutter and the bearing journal on opposed bearing surfaces to block the flow of lubricant outwardly past the bearing means and to block the passage of foreign matter such as drilling fluid with cuttings entrained therein inwardly to the bearing means. Rock drill bits typically have utilized roller cutters thereon mounted for rotation at relatively low speeds such as around 125 RPM, for example. As a result of the relatively high loads that may be placed on a drill bit during operation, a relatively large bearing clearance has been provided between the cutter and bearing journal such as around 0.001 inch to 0.004 inch per inch of diameter of the cutter, for example, which provides a relatively large gap which must be sealed at all times during rotation of the cutter for retaining the lubricant within the bearing means and preventing the entry of foreign matter past the sealing means. To accomplish this, seals heretofore have required a relatively large amount of deformation or squeeze when placed between the bearing surfaces on the journal and the cutter, such as around 0.035 inch, for example. When such seals are provided with such a large amount of deformation or squeeze, a substantial sliding friction is provided between the cutter and the seal, and when relatively high rotational speeds are involved, a substantial amount of heat will be generated thereby causing wear and decreasing the life of the seal.

Another problem frequently encountered in such rock drill bits is the wobbling of the cutter resulting from eccentric rotation of the cutter. The seal between the cutter and the journal must compensate for any eccentricity or wobbling and must seal at all times during rotation, even with the wobbling. Thus, a substantial amount of deformation or squeeze is required for the seal such as the aforementioned 0.035 inch in order to compensate for any wobbling of the roller cutter. High temperatures generated from sliding friction of an elastomeric seal might result in a permanent set or deformation of the seal and thereby reduce the ability of the seal to close the clearance between the journal and cutter and effectively seal at all times during rotation of the cutter.

Rock drill bits normally have a relatively large clearance provided between the cutter and the bearing journal to compensate for the relatively high operating temperatures encountered in severe conditions, such as 300° F., for example, as the difference in the coefficient of expansion between the roller cutter and the associated journal and bushings requires a relatively large gap or clearance. Further, a high viscosity grease is usually employed for lubrication purposes and a relatively large clearance is needed for the grease to easily enter the bearings.

Heretofore, such as shown in U.S. Pat. Nos. 3,656,764 dated Apr. 18, 1974 and 4,466,621 dated Aug. 21, 1985, seal assemblies utilizing two separate but similar O-ring seals have been provided for drill bits between the journal and roller cutter thereon, one O-ring seal engaging a sealing surface on the roller cutter and the other O-ring seal engaging an opposed sealing surface on the journal. The O-ring seals illustrated have been separated by a floating ring maintaining a compression on both O-rings.

Another drill bit bearing seal assembly is shown in U.S. Pat. No. 3,467,448 dated Sept. 16, 1969 and this seal assembly includes a dynamic seal and a static seal separated by a metal ring. The dynamic seal comprises an O-ring mounted in a groove. The static seal, however, is bonded on one face to the metal ring separating the seals, and on an opposite face to a separate ring or metal sealing surface. Thus, only a relatively small portion of the periphery of the static ring is unbonded and permitted to deform or deflect thereby providing a very stiff or relatively rigid static seal.

An example of a roller cutter bearing seal assembly in which a pair of face seals separated by a metal ring are employed is illustrated by U.S. Pat. Nos. 4,344,629 dated Aug. 17, 1982 and 4,394,020 dated July 19, 1983. An O-ring which forms the dynamic seal is utilized only as a secondary seal until a primary lapped metal-to-metal seal is formed by wear during operation of the drill bit.

SUMMARY OF THE INVENTION

Higher rotational speeds of the cutter result in a higher rate of penetration by the drill bit and are desirable. However, the higher rotational speeds may result in a reduction of the life of the drill bit including the seals and bearings which sometimes make such high rotational speed undesirable and uneconomical. Cutter rotational speeds of as high as around 500 RPM may be obtained by down hole motors which are being used more widely. The high rotational speeds result in generation of heat from the sliding friction between the seals and adjacent bearing surfaces. It is desirable to minimize sliding friction so that any heat resulting therefrom is minimized. The amount of squeeze or deformation of a sliding dynamic seal has a direct relationship on the amount of sliding friction generated, and it is desirable to have as small an amount of deformation as possible which will provide the desired sealing under the service conditions encountered.

A contrast has been noted between the characteristics of the seals for rotating members in rock drill bits as opposed to seals for rotating members in conventional machinery where rotational speeds are much higher. One important difference is in the amount of squeeze or deformation of the elastomeric seals for bearing journals on rock bits as compared with similar seals for rotating members on journals of conventional machinery. The deformation or deflection of the elastomeric seals in rock bits which are squeezed or deformed to an out-of-round position is substantially higher than for similar seals in conventional machinery. To illustrate certain differences and characteristics between normal service conditions and seal requirements for rock drill bits and similar rotating members for conventional machinery, the following table is provided:

|  | Seals for Cutters on Rock Drill Bits (7⅞" rock bit) | Seals for Similar Rotating Members on Conventional Machinery |
| --- | --- | --- |
| Clearance between journal and rotating member (Inch per inch of journal diameter) | .001–.004 | .0005–.0010 |
| Squeeze (Inches) | .035 | .005–.010 |
| Cutter Speed (RPM) | 100–150 typical | 400 and greater |
| Sliding Velocity (FPM) | 50–150 typical | 400 and greater |
| Operating Temp (°F.) | 185–300 | 185 or Less |
| Sealing Gaps (Inches) | .003–.009 | .002 or Less |
| Expected Maximum Life (Hours) | 50–200 | Over 500 |

Many of the above seal characteristics are required by or related to the high rotational speeds required in conventional machinery as contrasted with the relatively low rotational speeds of rock drill bits. The present invention is particularly adapted for high rotational speeds and utilizes certain of the characteristics for seals in conventional machinery as set forth above. To provide an effective seal for roller cutters having high rotational speeds, such as 500 RPM obtained with downhole motors, for example, it has been found desirable to have two separate resilient seals, one a dynamic sliding resilient radial seal which is mounted for rotation relative to its associated radial sealing surface, and the other a static resilient seal which is fixed in relation to its associated sealing surface. By having one seal which is a dynamic sliding seal and subjected to sliding friction, such a seal can be specifically designed with a specific hardness for a high wear characteristic and with a minimum amount of deflection or squeeze, thereby to minimize the sliding friction.

In contrast, the static seal which is not subjected to sliding friction is preferably designed with a lower spring rate and of a material softer than the sliding dynamic seal, and has a deflection or deformation substantially greater than the dynamic seal in order to compensate for any eccentric rotation or wobbling of the cutter on its journal while maintaining an effective sealing relation. Thus, two separate and distinct seals are provided, each designed for accomplishing different functions and having characteristics different from the other.

The improved bearing seal assembly comprising the present invention is mounted between a pair of sealing surfaces on the drill bit journal and roller cutter. The improved seal assembly comprises a static resilient seal adjacent one of the sealing surfaces, a dynamic sliding seal adjacent the other of the sealing surfaces, and a generally rigid carrier or carrier ring between the static seal and the sliding seal to maintain a compressive load thereon for squeezing or deforming the seals adjacent their associated sealing surfaces. The static seal is preferably substantially softer than the dynamic sliding seal, so that upon eccentric rotation or wobbling of the roller cutter on the journal, the static seal easily deforms to accommodate such wobbling while maintaining an effective sealing relation between the carrier and its associated sealing surface. The static seal and carrier ring are constructed and arranged to prevent any substantial rotation between the carrier and the static seal so that the static seal is not subjected to sliding friction from its bearing surfaces. The sliding seal is deflected or deformed between its associated sealing surface and the carrier an amount sufficient to maintain an effective sealing relation while having minimal sliding friction.

The static seal may be arranged adjacent either the roller cutter or the journal, as desired. As the carrier separating the static seal and sliding seal is designed so that it does not rotate relative to the static seal, the static seal is formed of a material having a softness, spring rate, and deflection tailored for the function of compensating for the wobbling or eccentric rotation of the roller cutter while maintaining an effective sealing relation.

It is an object of this invention to provide a seal assembly for a rotary drill bit having a roller cutter especially adapted for high rotational speeds, such as 500 RPM.

Another object of this invention is to provide such a seal assembly for a drill bit having two separate and distinct resilient seals, each designed for accomplishing a different function and having certain characteristics different from the other.

A further object of this invention is to provide such a seal assembly positioned between separate sealing surfaces on a cutter and associated journal with a resilient static seal engaging one sealing surface and a dynamic sliding seal engaging the other sealing surface, the resilient seals being separated by a generally rigid carrier mounted so that there is little relative rotational movement between the carrier and the static seal.

Another object is to provide a seal assembly for a rotary drill bit having a static seal and a separate dynamic sliding seal with the sliding seal being harder and of increased wear characteristics than the static seal, and having a minimum deformation or deflection, thereby to minimize the sliding friction between the dynamic sliding seal and its associated bearing surfaces.

Other objects, features, and advantages of this invention will become more apparent after referring to the following specification and drawings.

DESCRIPTION OF THE INVENTION

Figure 6:
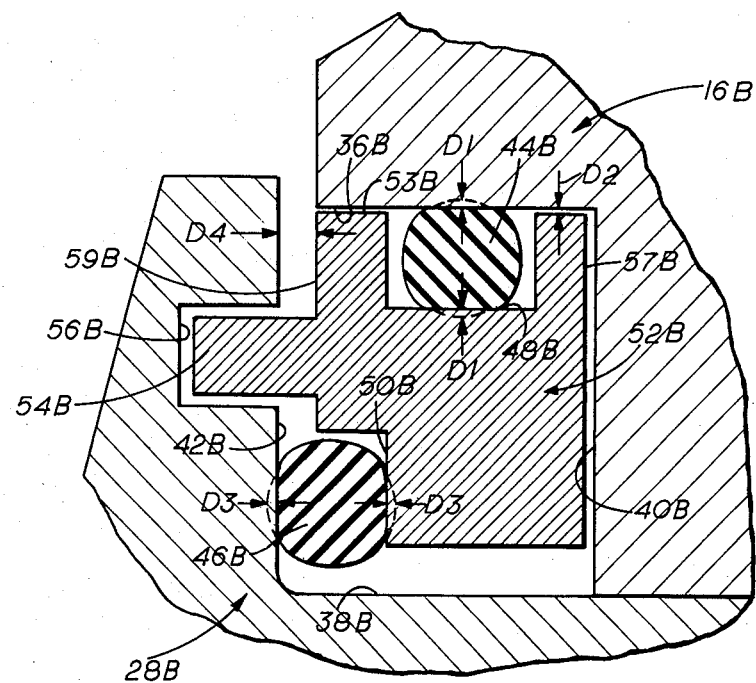
Figure 7:
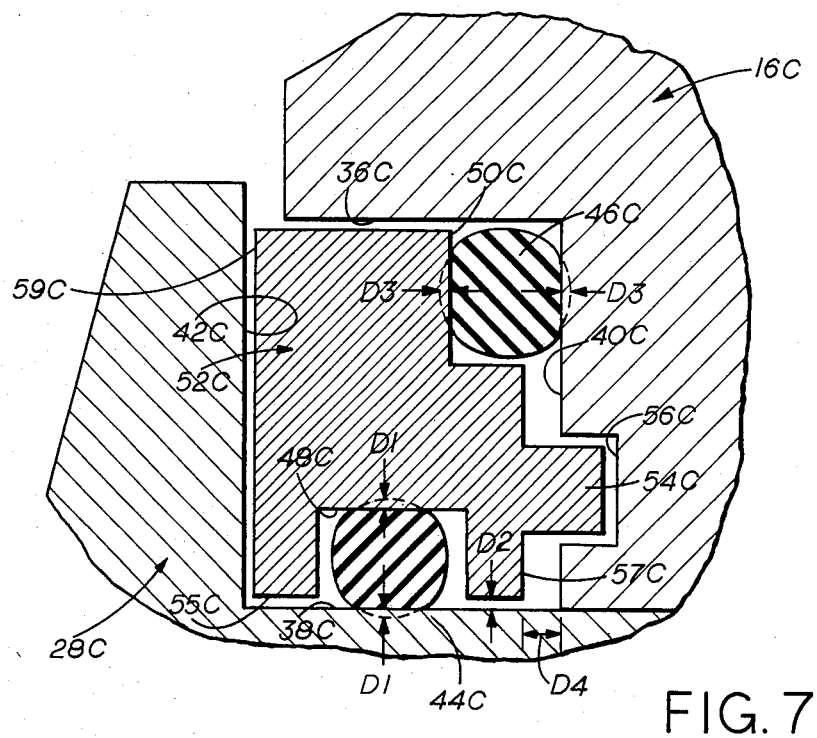

FIG. 6 is an enlarged section of an additional embodiment showing a seal assembly with the static seal mounted in sealing contact with a sealing surface on the journal perpendicular to the sealing surface on the cutter; and FIG. 7 is an enlarged section of the seal assembly of this invention, but showing the dynamic seal in sealing engagement with the journal and the static seal in sealing engagement with the cutter.

Figure 1:
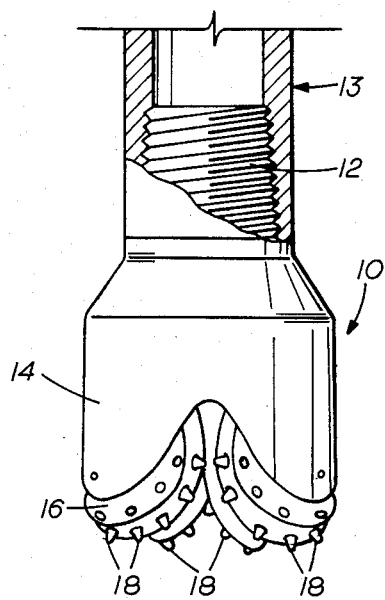
FIG. 1 is an elevation of a rock drill bit showing a plurality of rotary cutters on the end thereof.
Figure 2:
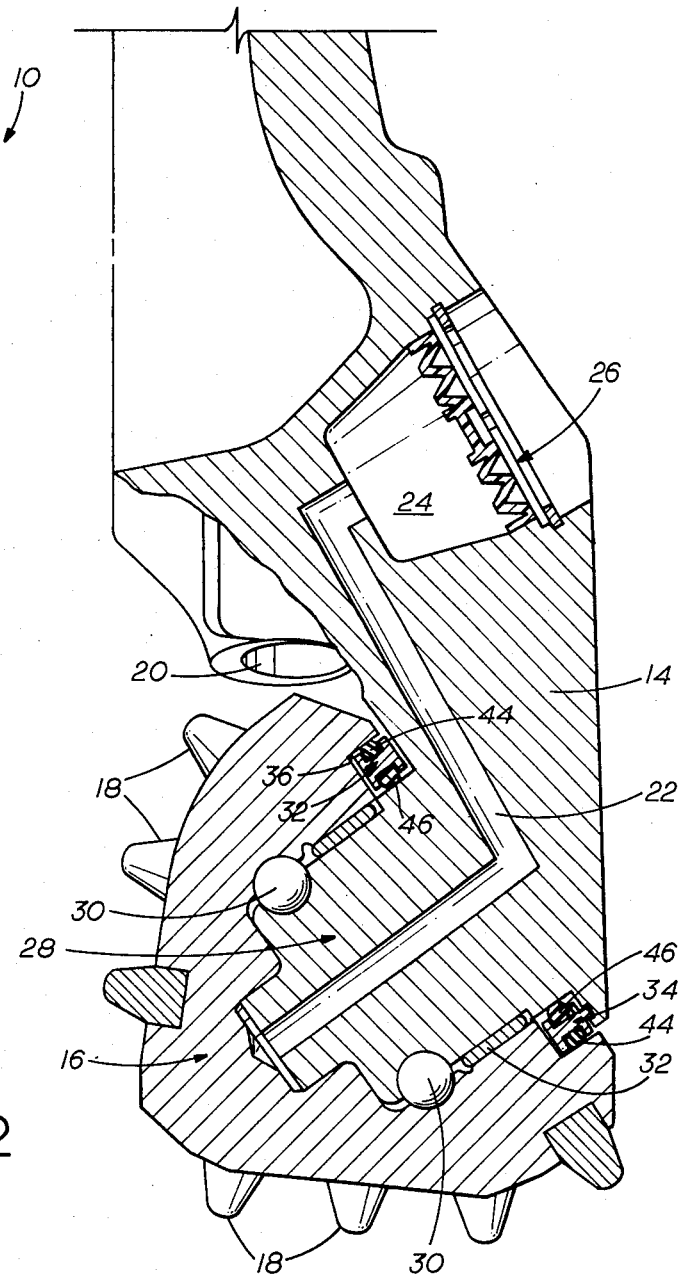
FIG. 2 is a partial longitudinal sectional view illustrating the mounting of a rotary cutter on the lug forming a segment of the bit body and showing the improved seal assembly comprising the present invention mounted between radially spaced surfaces on the roller cutter and the bearing journal.

Referring now to the drawings for a better understanding of the invention, and more particularly to FIGS. 1 and 2, a typical rock drill bit is illustrated generally at 10 having a threaded upper end at 12 which may be connected to the lower end of a drill string illustrated generally at 13 for drilling an oil well or the like. Rotary drill bit 10 is normally formed of three elongated body sections or lugs indicated at 14 which are welded together to form the completed bit body. Each body section or lug 14 has a roller cutter 16 thereon for rotation. Cutter 16 has cutting teeth 18 thereon for engaging in cutting relation a formation to be drilled. Drilling fluid from drill string 13 is supplied through suitable nozzles 20 to aid in the cutting operation as well known in the art.

A lubricant channel is shown at 22 which communicates with a lubricant reservoir 24 having a pressure compensator indicated generally at 26 therein to maintain a uniform lubricant pressure. At the end of each lug 14 a bearing journal indicated generally at 28 is shown for mounting cutter 16 thereon for rotation. Ball bearings 30 and a floating journal bushing 32 are mounted between roller cutter 16 and journal 28 as well known in the art.

The improved seal assembly forming an important part of this invention is illustrated generally at 34 and is mounted between cutter 16 and journal 28 to hold the lubricant within cutter 16 and prevent foreign matter such as cuttings entrained with drilling fluid from entering journal 28.

Figure 3:
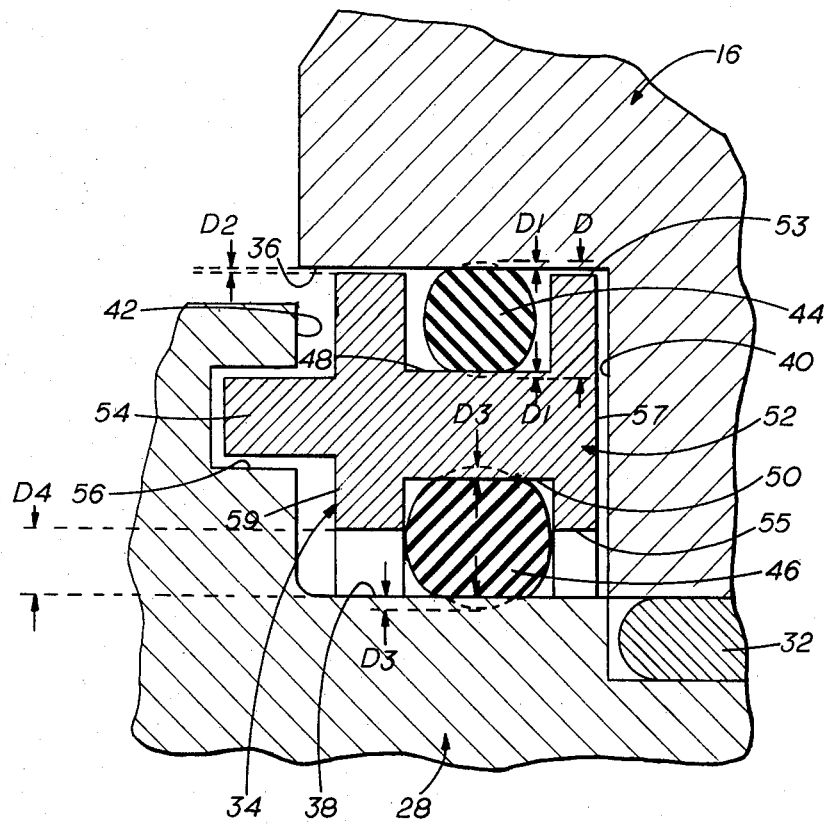
FIG. 3 is an enlarged fragment of FIG. 2 illustrating the seal assembly forming the present invention having a static seal and a dynamic seal with the dynamic seal in sealing engagement with the cutter.
Figure 5:
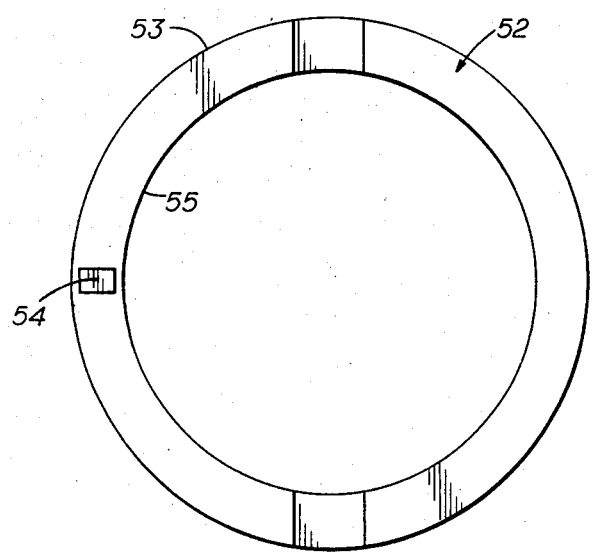
FIG. 5 is a plan of the seal carrier shown in FIG. 4.
Figure 4:
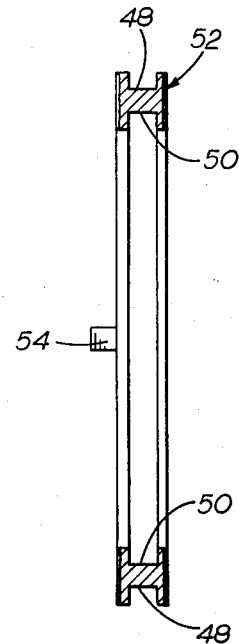
FIG. 4 is a cross section of the seal carrier of the seal assembly removed from the drill bit.

Seal assembly 34, as shown particularly in FIG. 3, is fitted between a sealing face or surface 36 on cutter 16 and an opposed radial spaced sealing face or surface 38 on journal 28. An annular groove or pocket is formed to receive seal assembly 34 between radially spaced surfaces 36 and 38 and axially spaced faces 40 and 42 on respective cutter 16 and journal 28. Seal assembly 34 includes a dynamic sliding seal 44 and a static seal 46 received within respective annular grooves 48 and 50 in a substantially rigid seal carrier or ring generally indicated at 52. Carrier 52 has an outer peripheral radial surface 53 adjacent surface 36 and an inner peripheral radial surface 55 adjacent surface 38. Opposed side surfaces 57 and 59 of carrier 52 are positioned adjacent respective surfaces 40 and 42 on cutter 16 and journal 28. A key or projection 54 on carrier 52 is loosely received within a receiving slot or notch 56 in journal 28 to prevent relative rotation of carrier 52. Thus, upon rotation of cutter 16, static seal 46 and carrier 52 remain rotationally stationary with respect to journal 28 while sliding or dynamic seal 44 may move with cutter 16. Since sliding seal 44 is mounted for rotational movement relative to carrier 52 and cutter 16, sliding friction is generated. It is noted that seals 44 and 46 are not secured in any manner to any contacting or sealing surfaces and therefore maintain maximum sealing characteristics including flexibility.

It is to be understood that means other than key 54 could be employed to limit any rotational movement between static seal 46, carrier 52 and journal 28.

It is desirable that seal 44 be of a sufficient hardness and of a minimum deformation so that undue wear does not result from friction or high temperatures, and yet the deformation must be adequate to maintain an effective sealing relation between surface 36 and the bottom of groove 48 at all times. Seal 44 is an O-ring preferably formed of an elastomeric material such as a rubber or rubber-like material and having a Shore A durometer hardness of between around eighty (80) and ninety (90). As indicated, it is desirable that a minimum initial deflection or squeeze on seal 44 should be provided by ring 52. As shown in FIG. 3, the initial total squeeze of the cross section of seal 44 indicated at D1 is of an optimum range between around 0.005 inch. However, a deflection or deformation in the range of between around 0.003 inch and 0.020 inch would function satisfactorily under certain conditions. It is pointed out that O-ring 44 is sealing against a radial surface 36 on cutter 16, and the radial clearance D2 between radial surface 36 and outer peripheral surface 53 on carrier 52 is normally very small, preferably around 0.005 to 0.0020 inch. Thus, the maximum dynamic change of the deflection of the cross section of O-ring 44 during operation is also very small. The deformation or compression of the cross section of dynamic O-ring 44 upon initial assembly as indicated at D1 is preferably below ten percent (10%) of the cross sectional diameter indicated at D of unrestrained O-ring 44.

Any additional deflection or deformation of O-ring 44 during operation after initial positioning of seal assembly 34 is limited by the clearance or gap indicated at D2 between surface 36 of cutter 16 and outer circumferential surface 53 of carrier 52. The clearance D2 between radial surface 53 and surface 36 is very small upon initial assembly so that upon subsequent operation intermittent contact will be made between surfaces 36 and 53. However, it is noted that the clearance between inner radial surface 55 and surface 38 indicated at D4 is relatively large so that no contact is permitted between surfaces 38 and 55.

Static seal 46 is shown as an O-ring formed of an elastomeric material having a Shore A durometer hardness of around 40 to 70, or at least around 10 durometer units less than the durometer hardness of sliding seal 44. The initial squeeze or deflection of the cross section of seal 46 indicated at D3 as shown in FIG. 3 is at least twenty-five percent (25%) greater, and preferably between two and three times greater, than the deflection of O-ring 44 indicated at D1. Further, the spring rate (a measurement of pounds of force per inch of deflection) of static seal 46 should be relatively small. It is noted that the total cross sectional compression of O-rings 44 and 46 is the total of D1 and D3, respectively, on both sealing surfaces of O-rings 44 and 46 as O-rings 44 and 46 are compressed equally on opposite sides thereof between two contacting sealing surfaces.

The radial gap or clearance indicated at D4 between radial face 38 on journal 28 and inner circumferential surface 55 of carrier 52 is greater than any expected eccentric rotation of cutter 16 resulting in wobbling. Static seal 46 is preferably of a softer material than sliding seal 44. While the size of gap D4 normally increases with the increase in the diameter of journal 28, a journal 28 of a diameter of two (2) inches measured by the diameter of surface 38 has a gap D4, for example, between around 0.030 inch and 0.060 inch. The deformation or deflection D3 of the cross section of O-ring 46 is preferably several times greater than any eccentric rotation of cutter 16 resulting in wobbling. The amount of compression or deformation in O-rings 44 and 46 which influences their frictional resistance is determined by the sizing or dimensioning of O-rings 44 and 46 and grooves 48, 50 in rigid carrier 52. Thus, a wide variety of sizes and sealing characteristics may be obtained by the present invention.

From the above, it is apparent that sliding seal 44 and static seal 46 have different functions and each of the seals is designed or tailored to carry out its intended function. Dynamic seal 44, since it is subjected to sliding friction, normally is formed of a harder material for better wear properties than static seal 46 which is not subject to any appreciable sliding friction since it does not move relative to its two contacting surfaces at 38 and the bottom of groove 50. Therefore, static seal 46 is formed of a material with characteristics to compensate for the wobbling or eccentric rotation of cutter 16 while yet maintaining a sealing relation between radial surface 38 and the bottom of groove 50 at all times. With such an arrangement, a high rotational speed can be obtained by cutter 16, such as around 500 RPM, for example.

At times, an O-ring with a round cross section having a relatively small amount of deformation or squeeze permits the entry of foreign matter such as small particles between the seal and the adjacent sealing surface which will score or erode such surfaces. Other seal shapes may be desirable to minimize the intrusion or entry of foreign matter such as an elastomeric ring of a rectangular cross section, for example, when such foreign matter creates a potential problem.

It is apparent that different shapes or forms of dynamic sliding seals and static seals may be utilized to seal against different surfaces on the cutter and the journal mounting the cutter. For example, referring to FIG. 6, an embodiment is shown in which carrier 52B, dynamic seal 44B, and static seal 46B, are mounted in a an annular groove or pocket formed between opposed radially spaced surfaces 36B and 38B on respective cutter 16B and journal 28B, and opposed axially spaced surfaces 40B and 42B formed on respective cutter 16B and journal 28B. Axially spaced surfaces 40B and 42B are spaced longitudinally along the axis of rotation of cutter 16B on journal 28B. The dynamic seal formed by dynamic O-ring 44B is mounted in a circular groove 48B in rigid carrier 52B and is formed with an initial compression or deflection between surfaces 36B and 48B as indicated at D1. The radial clearance between radial surface 36B and outer peripheral surface 53B of carrier 52B is measured at D2 and the axial clearance between surface 59B of carrier 52B and face 42B on journal 28B is measured at D4.

The static seal formed by O-ring 46B is mounted in an annular corner notch or groove 50B in carrier 52B and seals between carrier 52B and face 42B on journal 28B in an axial direction. O-ring 46B is initially compressed between surfaces 42B and 50B an amount at D3.

Face 57B of carrier 52B is normally in contact with axial face 40B after insertion of carrier 52B and seals 44B and 46B. Key 54B fits within a notch 56B in journal 28B to prevent rotation of carrier 52B relative to journal 28B. The deformation of O-rings 44B and 46B measured at D1 and D3 along with clearances D2 and D4 are similar to the embodiment shown in FIGS. 1-5. Thus, while the dynamic seal formed by O-ring 44B is in sealing engagement with a radial face 36B, the static seal formed by O-ring 46B is in contact with an axial face 42B as indicated, and the present invention may be carried out in such manner.

FIG. 7 is an additional modification of my invention in which carrier 52C, dynamic seal 44C, and static seal 46C are mounted within an annular groove or pocket formed by radially spaced surfaces 36C and 38C on respective cutter 16C and journal 28C, and axially spaced surfaces 40C and 42C formed on respective cutter 16C and journal 28C. The dynamic seal formed by O-ring 44C is mounted within groove 48C in carrier 52C, and static seal 46C is mounted within an annular corner notch 50C formed in carrier 52C. Dynamic seal 44C is compressed an amount measured at D1 between radial surface 38C and the bottom of groove 48C. Gap D2 is formed between radial surface 38C on journal 28C and inner peripheral surface 55C on carrier 52C. Static seal 46C is compressed an amount measured at D3 and seals between the gap formed between axial face 40C on cutter 16C and side surface 50C on carrier 52C. A key 54C mounted in notch 56C of cutter 16C mounts carrier 52C and static seal 46C for rotation with cutter 16C relative to journal 28C. Upon assembly, side surface or face 59C of carrier 52C is in contact with axial face 42C on journal 28C. The dimensions shown for D1, D2, D3, and D4 are similar to those in the embodiment of FIGS. 1-5.

In all of the embodiments illustrated, the deflection or deformation of the sliding seal is substantially the same. Further, the sliding seal of all embodiments preferably has a hardness greater than the hardness of the static seal. Also, the deflection of the static seal is at least twenty-five percent (25%) greater than the deflection of the sliding seal, and is preferably two or three times the deflection of the sliding seal, in order to compensate for any wobbling of the cutter. The carrier and static seal are constructed and arranged so that they do not rotate relative to each other and to the associated sealing surface, whether the sealing surface is adjacent the journal or adjacent the cutter, thereby preventing any sliding frictional contact for the static seal. As a result of the above, an improved seal assembly for mounting between the cutter and journal of a drill bit has been provided which is particularly adapted for high rotational speeds at all times between the cutter and journal. The dynamic seal is provided with a minimal compression, preferably below ten (10) percent of its unrestrained cross sectional diameter and the static seal preferably has a compression or deformation over ten (10) percent of its unrestrained diameter.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

We claim:

1. In a rotary drill bit having a bit body with a generally cylindrical bearing journal at its lower end and a generally conical roller cutter mounted on the bearing journal for rotation;

an improved bearing seal assembly mounted between a pair of sealing surfaces on the journal and roller cutter; said seal assembly comprising:

a static resilient seal adjacent one of said sealing surfaces;

a dynamic sliding resilient seal of an elastomeric material adjacent the other of said sealing surfaces; and a substantially rigid carrier between said static seal and said dynamic seal and engaging said seals for maintaining a compressive load thereon to squeeze said seals against their associated sealing surfaces in a sealing relation, said static seal being deformed an amount at least 25% greater than the amount of deformation of said dynamic seal, the deformation of said dynamic seal being less than ten (10) percent of its original unrestrained thickness; and means to limit any rotational movement of said static seal relative to its sealing surfaces, said static seal and said dynamic seal being unsecured to their respective associated sealing surfaces.

2. In a rotary drill bit as set forth in claim 1 wherein said dynamic seal is positioned against a radially sealing on the cutter and said static seal is positioned against a sealing surface on the journal.

3. In a rotary drill bit as set forth in claim 1 wherein said dynamic seal is positioned against a radially sealing surface on the journal and said static seal is positioned against a sealing surface on the cutter.

4. In a rotary drill bit having a bit body with a generally cylindrical bearing journal at its lower end and a generally conical roller cutter mounted on the bearing journal for rotation; said improved bearing seal assembly mounted between a pair of sealing surfaces on the journal and roller cutter and comprising:

a static annular seal adjacent one of said sealing surfaces;

a dynamic sliding annular seal of an elastomeric material adjacent the other of said sealing surfaces;

a substantially rigid carrier between said static seal and said dynamic seal and engaging said seals for exerting a compressive load thereon to maintain said seals against their associated sealing surfaces in a sealing relation; and means to prevent relative rotation between said carrier and said static seal, and to permit relative rotation between said carrier and said dynamic seal;

said static seal being squeezed against its sealing surface with a deformation at least 25% greater than the deformation of said dynamic seal against its sealing surface, the deformation of said dynamic seal being less than ten (10) percent of its original unrestrained thickness and the deformation of said static seal being over ten (10) percent of its original unrestrained thickness.

5. In a rotary drill bit as set forth in claim 4 wherein said dynamic seals and said static seals are O-rings, said dynamic seal having a durometer hardness at least five (5) units greater than the durometer hardness of said static seal.

6. An improved seal assembly for a rotary drill bit mounted between a pair of sealing surfaces on a generally cylindrical bearing journal and an associated roller cutter; said seal assembly comprising:

a resilient static seal adjacent one of said sealing surfaces;

a sliding dynamic seal of an elastomeric material adjacent the other of said sealing surfaces;

a generally rigid seal carrier between said seals and engaging said seals for exerting a force thereon to squeeze said seals against their associated sealing surfaces, said elastomeric sliding dynamic seal being squeezed against its associated sealing surface with a deflection of between about 0.003 inch and 0.020 inch and having a durometer hardness of at least around seventy-five;

said static seal being deformed an amount at least 25% greater than the amount of deformation of said sliding seal thereby to accommodate wobbling of said roller cutter on said journal; and means to prevent relative rotation between said carrier and said static seal and to permit relative rotation between said carrier and said dynamic seal, said static seal and said dynamic seal being unsecured to their associated sealing surfaces.

7. An improved seal assembly as set forth in claim 6 wherein said seals are radially spaced from each other and engage radially spaced surfaces on said journal and cutter for sealing therebetween.

8. An improved seal assembly as set forth in claim 7 wherein said carrier has grooves on its inner and outer peripheral surfaces receiving said static seal and said dynamic seal.

9. An improved seal assembly for a rotary drill bit mounted between a pair of sealing surfaces on a generally cylindrical bearing journal and an associated roller cutter; said seal assembly comprising:

a resilient static seal adjacent one of said sealing surfaces;

a sliding dynamic seal of an elastomeric material adjacent the other of said sealing surfaces;

a generally rigid seal carrier between said seals and engaging said seals for exerting a force thereon to squeeze said seals against their associated sealing surfaces, said elastomeric sliding dynamic seal being squeezed against its associated sealing surface with a deflection of less than ten (10) percent of its original unrestrained thickness and having a durometer hardness of at least around seventy-five;

said static seal having a durometer hardness less than around seventy (70) and having a spring rate less than the spring rate of said sliding seal, said static seal deflecting an amount greater than ten (10) percent of its original unrestrained thickness when initially positioned and adapted to accommodate wobbling of said roller cutter on said journal; and means to prevent relative rotation between said carrier and said static seal, and to permit relative rotation between said carrier and said dynamic seal.

10. An improved seal assembly as set forth in claim 9 wherein said static seal and said dynamic seal are O-rings.

11. In a rotary drill bit having a bearing journal, bearing means mounting a roller cutter on the bearing journal, and a lubrication system for providing lubricant to the bearing means; an improved seal means mounted between sealing surfaces on the roller cutter and bearing journal for blocking flow of lubricant outwardly past the bearing means and blocking passage of foreign matter inwardly to the bearing means, said improved seal means comprising:

a resilient static seal adjacent one of said sealing surfaces;

a sliding dynamic seal of an elastomeric material adjacent the other of said opposed sealing surfaces;

a generally rigid seal carrier between said seals and engaging said seals for exerting a force thereon to squeeze said seals against their associated bearing surfaces, said elastomeric sliding seal being squeezed against its associated sealing surface with a deflection less than the deflection of said static seal;

said static seal being deformed an amount at least 25% greater than the deformation of said sliding seal and said dynamic seal being deformed an amount less than ten (10) percent of its original unrestrained thickness thereby to accommodate wobbling of said roller cutter on said journal; and means to prevent relative rotation between said carrier and said static seal, and to permit relative rotation between said carrier and said sliding seal.

12. In a rotary drill bit as set forth in claim 11 wherein said static seal is an elastomeric O-ring having a durometer hardness at least ten units less than the durometer hardness of said sliding seal.

13. In a rotary drill bit as set forth in claim 11 wherein said carrier has opposed grooves therein receiving said static seal and said dynamic seal.

* * * * *